Patented Dec. 1, 1942

2,303,364

UNITED STATES PATENT OFFICE 2,303,364

PROCESS AND PRODUCT FOR MAKING TEXTILE AND OTHER MATERIAL WATER REPELLENT

Erik Schirm, Dessau in Anhalt, Germany, assignor, by mesne assignments, to Heberlein Patent Corporation, New York, N. Y., a corporation of New York No Drawing. Application November 5, 1938, Serial No. 239,186. In Germany November 8, 1937

11 Claims. (Cl. 8—115.5)

This invention relates to processes and compositions for making textiles, fibers and other like materials water-repellent.

In recent years the problem of rendering textiles and various other fibers water-repellent has received much attention from those interested in the textile treating arts. Media for rendering textiles water-repellent improve the properties of the textiles in other respects. Among the problems which confront the industry in finding a satisfactory water-repellent may be mentioned the problem of cheapness and availability of the treating compositions and stability against the action of organic cleaning fluids, as well as against the action of water. Aside from cost and availability, the water-repellent must not deteriorate the materials being treated.

It is an object of this invention to provide inexpensive and stable water-repellents for the treatment of textiles, fibers, and the like. It is also a purpose of the present invention to provide new types of fibrous materials which are water-repellent and at the same time stable in storage and resistant to deterioration.

Another object of the instant invention is to provide a process for permanently attaching the water-repellent compositions to the fibers being treated. Yet another purpose is to provide an inexpensive water-repellent composition that can be produced from readily available organic compounds.

It is already known to the present applicant that many textiles and other materials can be made reasonably satisfactorily water-repellent by treating them with higher molecular organic isocyanates and that the treated materials are stable against organic solvents and against washing with ordinary soaps. In accordance with the present invention compounds are employed comprising the reaction product of di- and other poly-isocyanates with higher molecular organic compounds, which readily react with poly-isocyanates, which impart superior water-repellent properties. The new process using these products is of particular commercial advantage because the compounds can be procured from cheap and readily available raw material. For instance, one can use as raw materials the lower molecular di-amines or di-carboxylic acids, which have many commercial uses and are readily obtainable, and convert them by conventional methods into di-isocyanates, isothiocyanates, or carboxylic acid azides. These compounds can in turn be reacted with readily available higher molecular fatty acids or fatty alcohols, thereby providing compositions which are immediately available for treating the textiles, fibers, and the like to render them water-repellent.

Another advantage of the instant process lies in the fact that among the higher molecular organic compounds which react readily with the poly-isocyanates are the higher molecular secondary amines, such, for example, as di-dodecyl amine, di-cetyl amine, and the like, that result as by-products of little commercial use from the preparation of the corresponding commercially valuable primary amines. Other advantages of the invention will clearly appear from the illustrative examples of the procedures, processes, and compositions which appear hereinafter.

Through the use of the process of the present invention, one can render textiles and fibers such as wool, cotton, cellulose, silk, synthetic silk, hemp, threads in skein or spun form, paper, cellulose, foil, leather, fur, and the like water-repellent by treating such materials with mixtures of organic poly-isocyanates such as di-isocyanates or di-isothiocyanates with higher moleccyanates or di-isothiocyanates with higher molecular organic compounds that contain groups which readily react with or have an affinity for the isocyanate or the isothiocyanate group and then subjecting these treated materials to a mild heating treatment.

It is to be understood that "poly-isocyanates" as herein used is to be interpreted as including all isocyanates and all isothiocyanates containing two or more said groups. In place of di- or poly-isocyanates one can also make use of the azides of di- or other poly-carboxylic acids such as di- and tri-carboxylic acid azides as these upon subjection to mild heat treatment are readily converted into the corresponding poly-isocyanate compounds.

The di- or other poly-isocyanates, di- or other poly-isothiocyanates, or di- or other poly-carboxylic acid azides used in accordance with the instant invention may belong to the aliphatic, carbocyclic or heterocyclic series as well as to a mixed series. As examples of readily prepared representatives of these groups there may be mentioned pentamethylene-di-isocyanate, meta- and para-phenylene-di-isocyanate, ortho-, meta-, and para-phenylene-di-isothiocyanate as well as the homologues and substitution products of the di-isocyanates and di-isothiocyanates; the para, para'-di-isocyanate and di-isothiocyanate of the diphenyls, of the di-phenyl methanes, of the di-benzyls, of the di-phenyl ethers and of the di-phenyl sulfides; the di-azides of aliphatic dicarboxylic acids, of malonic acid and other acids of the same series up to sebacic acid, etc.; tri-carballylic-acid triazide, the di-azide of iso- and terephthalic acid as well as its homologues and substitution products, of pyridine-2,4-, -2,5-, -2,6- and -3,5-dicarboxylic acid, of de-hydro mucic acid and the like.

As higher molecular compounds capable of reacting with isocyanates and isothiocyanates, it is preferable to employ higher molecular aliphatic and alicyclic alcohols such as, octyl alcohol, dodecyl alcohol, octadecyl alcohol, oleyl alcohol, ricinoleyl alcohol and the like as well as naphthenic alcohols, cholesterin, resin alcohols, such as abiesinol and the like. Other materials which are useable are the higher molecular aliphatic or alicyclic carboxylic acids such as normal saturated fatty acids included between caprylic acid and montanic acid as well as oleic-, brassic-, erucic acid, abietic acid, and other resinic acids, naphthenic acids and the like, as well as higher molecular primary and secondary fatty amines, as for example, octyl amine, cetyl amine, stearyl amine, montanyl amine, naphthenyl amine, abietyl amine, di-octyl amine, di-cetyl amine, and the like. Phenols and their hydrogenation products when nuclear substituted by a higher molecular hydrocarbon group, as for example secondary octa-decyl phenol, per-hydromenaphthyl-orthomethylcyclohexanol and the like are suitable for these purposes as well as aromatic amines substituted by a higher molecular hydrocarbon group in the nucleus or in the amino group or at both places, as for example, para-cetyl-aniline, N-tetradecylaniline, N,para-di-octylaniline wherein the amino group contains at least one unsubstituted hydrogen atom. The hydrocarbon groups of these alcohols, carboxylic acids, or amines may contain atoms or groups of atoms such as oxygen, sulfur, nitrogen, halogen, sulfonic-, carbonylic-, ester-, carbonic amide, sulfonamide-, nitro-, alkoxy groups and the like.

The success of the instant process probably depends fundamentally upon the di- or other poly-isocyanates or di- or other poly-isothiocyanates reaction, on the one hand, with the reactive higher molecular compounds, and on the other hand, with the material treated so that, for example, upon the treatment of a cellulosic material with a mixture composed of di-isocyanate and a higher molecular alcohol, compounds of the type:

Cellulose—O—CO—NH—R—NH—CO—O—R' are formed wherein R represents the radical of the di-isocyanate and R' the hydrocarbon group of a higher molecular alcohol. However, I do not wish to state unequivocally that a reaction between the cellulose and the treating substances occur, as I am not sure that such is the case nor am I sure of the chemical composition of the poly-isocyanates, etc., reacted with the reactive higher molecular compounds mentioned. It is nevertheless true that water-repellence is produced in textiles, fibers, and the like under the conditions herein set forth. Broadly considered the instant process is not limited to any sequence of treatments, for one can carry out the process by mixing the components and then treating the textile with the chemical compound thus formed, or, by bringing each of the components individually upon the material and permitting the reaction to take place in contact therewith.

While many modifications will occur to those skilled in the art, the invention may be illustrated by the examples which follow wherein the parts are expressed in parts by weight and the temperatures in degrees centigrade.

Example 1

Three parts of toluylene-2, 4-di-isocyanate and 4 parts of cetyl alcohol are melted on a water bath. After completion of the reaction, the mixture is diluted with 700 parts of warm benzine. One saturates viscose synthetic silk with the solution and dries it with gentle heating recovering the unused solvent. Then the material is heated for ½ hour at a temperature of 100–120°. The treated synthetic silk thus obtained possesses an extraordinarily water-repellent property which is stable against organic solvents and against washing with soap.

Example 2

One part of 1-chlorphenylene-2,5-di-isocyanate (prepared from the di-hydrochloride of 2-chlor-1,4-phenylene-di-amine and an excess phosgene in accordance with known procedure) and 2 parts of montanic acid, $C_{28}H_{56}O_2$, are dissolved with the aid of heat in five parts of monochlorbenzol whereupon the solution is gently boiled for some time. One then dilutes the solution with 600 parts of benzine, saturates cellulosic wool masses therewith and dries the same with the aid of gentle heating and then heats for ½ hour at a temperature of 100°. The material treated in this manner is strongly water-repellent.

Example 3

Three parts of N, N'-di-thiocarbonylbenzidine is dissolved with the aid of heat on a water bath in a sufficient quantity of toluol. To this solution one adds a solution containing 4 parts of di-n-dodecylamine and 20 parts of toluol and then heats for a short time to the boiling point of toluol. Then one saturates natural silk material with the mixture. After drying and heating to a temperature of 120°, the silk shows water-repellent properties.

Example 4

Five parts of freshly prepared sebacic acid-di-azide is dissolved in 250 parts of acetone. This solution is mixed with a solution of 6 parts of secondary-tetra-decyl phenol in 150 parts of acetone and is then used to saturate cotton yarn. After the solvent has been vaporized at room temperature, one heats the yarn for a short time at a temperature between 110–120°.

Example 5

To a solution of 3 parts of isophthalic acid-di-azide in 300 parts of benzol one adds a solution of 5 parts of para-octa-decylaniline in 500 parts of benzol, saturates wool with the solution mixture, wrings or centrifuges the material and then treats it with a current of air having a temperature of about 100°.

It should be understood that the present invention is not limited to the specific processes, compounds, and compositions herein disclosed but that it extends to all equivalent compounds, compositions, and processes which one skilled in the art would consider within the scope of the appended claims.

I claim:

1. In the process of rendering textiles, fibers, and the like water-repellent the steps which comprise heating poly-isocyanates and higher molecular organic compounds selected from the group consisting of alcohols, and carboxylic acids, each containing at least 8 carbon atoms in a hydrocarbon radical, until reaction takes place, treating said fibers with said reaction product and heating the textiles, fibers and the like in a substantially dry condition to at least about 100° C.

2. Compounds for rendering textiles, fibers, and the like water-repellent which comprises the reaction products of poly-isocyanates with higher molecular organic compounds selected from the group consisting of alcohols and carboxylic acids, each containing at least 8 carbon atoms in a hydrocarbon radical.

3. The process for making textiles, fibers, and the like water-repellent which comprises treating said materials with the reaction product of poly-isocyanates and higher molecular alcohols containing at least 8 carbon atoms in a hydrocarbon radical and heating the treated materials in a substantially dry condition to at least about 100° C.

4. The process for making textiles, fibers, and the like water-repellent which comprises treating said materials with poly-isocyanates and with higher molecular carboxylic acids containing at least 8 carbon atoms in a hydrocarbon radical, and heating the treated materials in a substantially dry condition to a temperature of at least about 100° C.

5. An agent for the treatment of fibrous materials to improve their qualities and to render them water-repellent which comprises an admixture of poly-isocyanates and higher molecular organic compounds selected from the group consisting of alcohols, and carboxylic acids, each containing at least 8 carbon atoms in a hydrocarbon radical, dispersed in an organic solvent of said poly-isocyanates and higher molecular organic compounds.

6. In the process for rendering fibers, and the like water-repellent by treating them with the reaction products of poly-isocyanates and higher molecular organic compounds the steps which comprises mixing together a poly-isocyanate and a higher molecular organic compound, selected from the group consisting of an alcohol, and a carboxylic acid, each containing at least 8 carbon atoms in a hydrocarbon radical, impregnating the fibers, and heating the impregnating fibers in substantially dry condition to at least about 100° C.

7. An agent for the treatment of fibrous materials to improve their qualities and to render them water-repellent which comprises an admixture of poly-isocyanates and higher molecular organic compounds selected from the group consisting of alcohols, and carboxylic acids, each containing at least 8 carbon atoms in a hydrocarbon radical.

8. The process for rendering textile fibers and the like water-repellent which comprises treating said materials with a poly-isocyanate and with a higher molecular organic compound selected from the group consisting of alcohols, and carboxylic acids, each containing at least 8 carbon atoms in a hydrocarbon radical, and heating the material in a substantially dry condition to a temperature of at least about 100° C.

9. Textiles, fibers and the like having water-repellent characteristics, treated with a higher molecular compound selected from the group consisting of alcohols, and carboxylic acids, each containing at least 8 carbon atoms in a hydrocarbon radical, and with a poly-isocyanate, and heated to temperatures between 100 and 120° C.

10. The process of rendering textile fibrous materials and the like water-repellent, which comprises impregnating the materials with a composition formed from toluylene-2, 4-di-isocyanate and cetyl alcohol, and heating the materials in substantially dry condition to a temperature of above about 100° C.

11. The process of rendering textile fibrous materials and the like water-repellent, which comprises impregnating the materials with a composition formed from 1-chlorphenylene-2, 5-di-isocyanate and montanic acid, and heating the materials in substantially dry condition to a temperature above about 100° C.

ERIK SCHIRM.

CERTIFICATE OF CORRECTION.

Patent No. 2,303,364.　　　　　　　　　　　　　　December 1, 1942.

ERIK SCHIRM.

It is hereby certified that error appears in the printed specification of the above numbered patent requiring correction as follows: Page 2, first column, line 14, for "abiesinol" read --abietinol--; and second column, line 29, for "100°" read --110°--; page 3, first column, line 42, claim 6, for "comprises" read --comprise--; and second column, line 3; same claim, for "impregnating" read --impregnated--; and line 16-17, claim 8, for "seletcted" read --selected--; and that the said Letters Patent should be read with this correction therein that the same may conform to the record of the case in the Patent Office.

Signed and sealed this 12th day of January, A. D. 1943.

(Seal)　　　　　　　　　　　　　　　　　　　Henry Van Arsdale,
　　　　　　　　　　　　　　　　　　　Acting Commissioner of Patents.